US012625311B2

(12) United States Patent
Fisher

(10) Patent No.: US 12,625,311 B2
(45) Date of Patent: May 12, 2026

(54) ASYMMETRIC PATTERNED REFLECTIVE COATING

(71) Applicant: Vitro Flat Glass LLC, Cheswick, PA (US)

(72) Inventor: Patrick Fisher, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 378 days.

(21) Appl. No.: 18/329,661

(22) Filed: Jun. 6, 2023

(65) Prior Publication Data

US 2023/0393315 A1 Dec. 7, 2023

Related U.S. Application Data

(60) Provisional application No. 63/349,652, filed on Jun. 7, 2022.

(51) Int. Cl.
*G02B 5/26* (2006.01)
*E06B 9/24* (2006.01)
*G02B 5/20* (2006.01)

(52) U.S. Cl.
CPC .................. *G02B 5/26* (2013.01); *E06B 9/24* (2013.01); *G02B 5/208* (2013.01); *E06B 2009/2417* (2013.01)

(58) Field of Classification Search
None
See application file for complete search history.

(56) References Cited

U.S. PATENT DOCUMENTS

| | | | |
|---|---|---|---|
| 4,193,236 A | 3/1980 | Mazzoni et al. |
| 4,379,040 A | 4/1983 | Gillery |
| 4,464,874 A | 8/1984 | Shea, Jr. et al. |
| 4,466,562 A | 8/1984 | DeTorre |
| 4,671,155 A | 6/1987 | Goldinger |
| 4,746,347 A | 5/1988 | Sensi |
| 4,792,536 A | 12/1988 | Pecoraro et al. |
| 4,861,669 A | 8/1989 | Gillery |
| 4,898,789 A | 2/1990 | Finley |
| 4,898,790 A | 2/1990 | Finley |
| 4,900,633 A | 2/1990 | Gillery |
| 4,920,006 A | 4/1990 | Gillery |

(Continued)

FOREIGN PATENT DOCUMENTS

| | | | | |
|---|---|---|---|---|
| CN | 107846871 B | * | 8/2021 | ............ A01M 29/08 |
| WO | 2017041085 A1 | | 3/2017 | |

*Primary Examiner* — Phu Vu
(74) *Attorney, Agent, or Firm* — The Webb Law Firm

(57) ABSTRACT

A coated article includes: a substrate having a first side and a second side; and a patterned coating over at least a portion of the second side of the substrate. The patterned coating includes: a first dielectric layer over at least a portion of the second side of the substrate; an absorbing layer over a first portion of the first dielectric layer and including a first reflected aesthetic, and absent over a second portion of the first dielectric layer and including a second reflected aesthetic; and a second dielectric layer over at least a portion of the absorbing layer. A contrast between the first reflected aesthetic and the second reflected aesthetic forms a pattern. The contrast between the first reflected aesthetic and the second reflected aesthetic is greater when viewing the coated article from a first direction, compared to viewing the coated article from a second direction.

20 Claims, 5 Drawing Sheets

(56) References Cited

U.S. PATENT DOCUMENTS

| | | | |
|---|---|---|---|
| 4,938,857 | A | 7/1990 | Gillery |
| 5,030,593 | A | 7/1991 | Heithoff |
| 5,030,594 | A | 7/1991 | Heithoff |
| 5,088,258 | A | 2/1992 | Schield et al. |
| 5,106,663 | A | 4/1992 | Box |
| 5,240,886 | A | 8/1993 | Gulotta et al. |
| 5,328,768 | A | 7/1994 | Goodwin |
| 5,385,872 | A | 1/1995 | Gulotta et al. |
| 5,393,593 | A | 2/1995 | Gulotta et al. |
| 5,492,750 | A | 2/1996 | Shumaker, Jr. et al. |
| 6,587,263 | B1 | 7/2003 | Tacovangelo et al. |
| 7,335,421 | B2 | 2/2008 | Thiel et al. |
| 7,588,829 | B2 | 9/2009 | Finley et al. |
| 7,910,215 | B2 | 3/2011 | Reymond et al. |
| 8,865,325 | B2 | 10/2014 | Polcyn et al. |
| 9,932,267 | B2 | 4/2018 | Polcyn et al. |
| 10,479,724 | B2 | 11/2019 | Ganjoo et al. |
| 10,526,243 | B2 | 1/2020 | Ridealgh et al. |
| 2003/0037569 | A1 | 2/2003 | Arbab et al. |
| 2004/0095645 | A1* | 5/2004 | Pellicori ............... G02B 5/285 |
| | | | 359/584 |
| 2007/0264479 | A1 | 11/2007 | Thiel et al. |
| 2011/0236715 | A1* | 9/2011 | Polcyn ................ C03C 17/3618 |
| | | | 428/209 |
| 2013/0059139 | A1* | 3/2013 | Ackermann ............ C23C 14/24 |
| | | | 428/522 |
| 2016/0109629 | A1 | 4/2016 | Baloukas et al. |
| 2017/0341977 | A1 | 11/2017 | Polcyn et al. |
| 2018/0043718 | A1 | 2/2018 | Masubuchi et al. |
| 2018/0118614 | A1* | 5/2018 | Polcyn ................ C03C 17/3647 |
| 2018/0173071 | A1 | 6/2018 | Mathew et al. |
| 2018/0217296 | A1 | 8/2018 | Weng et al. |
| 2019/0171034 | A1 | 6/2019 | Maurice et al. |
| 2019/0204480 | A1 | 7/2019 | Thiel et al. |

* cited by examiner

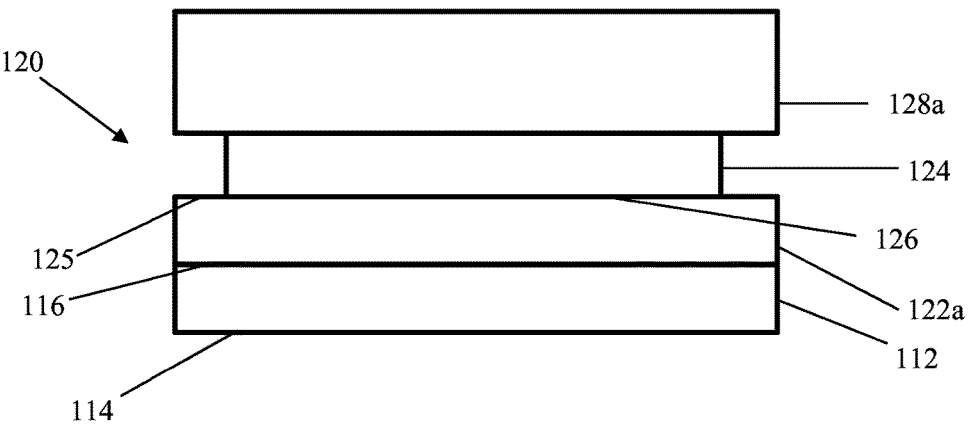
FIG. 3A
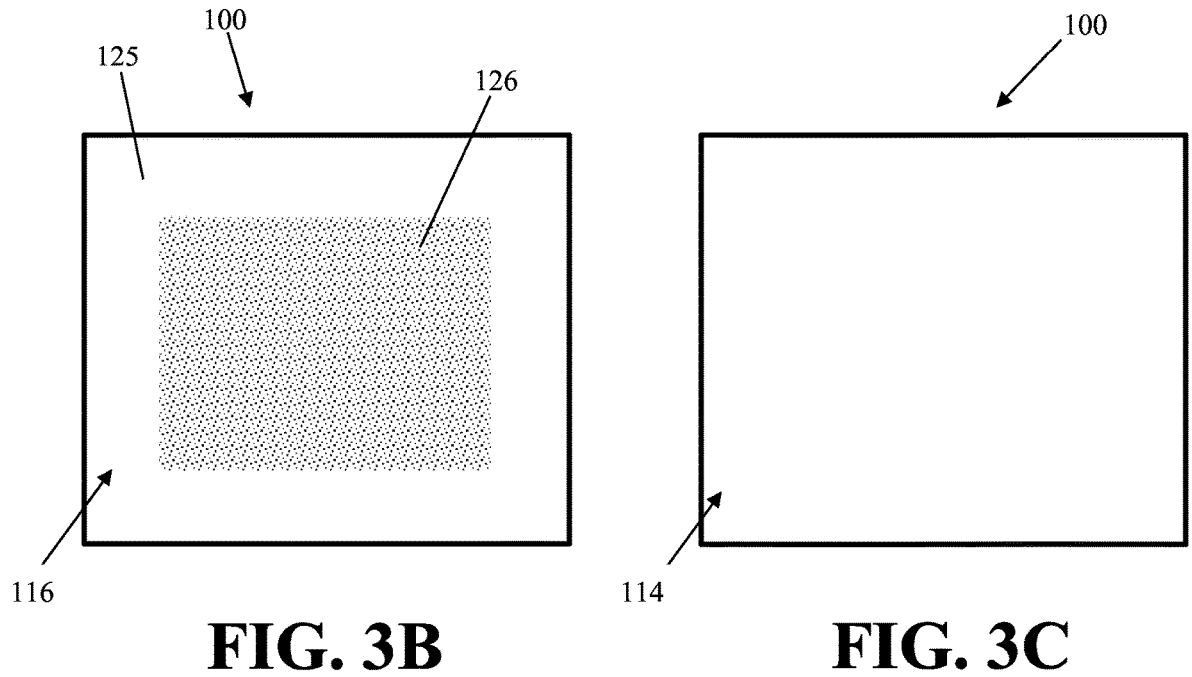
FIG. 3B                    FIG. 3C

ASYMMETRIC PATTERNED REFLECTIVE COATING

CROSS-REFERENCE TO RELATED APPLICATION

This application claims the benefit of U.S. Provisional Patent Application No. 63/349,652, filed Jun. 7, 2022, the disclosure of which is hereby incorporated by reference in its entirety.

BACKGROUND OF THE INVENTION

Field of the Invention

This invention relates generally to reflective coatings and articles coated with reflective coatings.

Technical Considerations

Reflective coatings are known in the field of architectural transparencies. Various methods are known for imparting a pattern onto a transparency or coating which is visible when viewing the transparency. However, due to the light transmittance of the transparency, the pattern is visible when viewed from both directions. This is not advantageous for many transparency applications because the pattern is only desired to be visible from one direction, with the view through the transparency from a second direction being unobstructed.

SUMMARY OF THE INVENTION

In one aspect of the present invention, a coated article includes: a substrate having a first side and a second side opposite the first side; and a patterned coating over at least a portion of the second side of the substrate, where the patterned coating includes: a first dielectric layer over at least a portion of the second side of the substrate; an absorbing layer over a first portion of the first dielectric layer and including a first reflected aesthetic, and absent over a second portion of the first dielectric layer and including a second reflected aesthetic; and a second dielectric layer over at least a portion of the absorbing layer; where a contrast between the first reflected aesthetic and the second reflected aesthetic forms a pattern; and where the contrast between the first reflected aesthetic and the second reflected aesthetic is greater when viewing the coated article from a first direction, as compared to viewing the coated article from a second direction.

Various non-limiting examples and aspects of the present invention will now be described and set forth in the following numbered clauses:

Clause 1: A coated article comprising: a substrate having a first side and a second side opposite the first side; and a patterned coating over at least a portion of the second side of the substrate, wherein the patterned coating comprises: a first dielectric layer over at least a portion of the second side of the substrate; an absorbing layer over a first portion of the first dielectric layer and comprising a first reflected aesthetic, and absent over a second portion of the first dielectric layer and comprising a second reflected aesthetic; and a second dielectric layer over at least a portion of the absorbing layer; wherein a contrast between the first reflected aesthetic and the second reflected aesthetic forms a pattern; and wherein the contrast between the first reflected aesthetic and the second reflected aesthetic is greater when viewing the coated article from a first direction, as compared to viewing the coated article from a second direction.

Clause 2: The coated article of clause 1, wherein the contrast between the first reflected aesthetic and the second reflected aesthetic is greater when viewing the coated article from the second side, as compared to viewing the coated article from the first side.

Clause 3: The coated article of clause 1 or clause 2, wherein a ratio of a thickness of the second dielectric layer to a thickness of the first dielectric layer is in the range of from 2:1 to 20:1.

Clause 4: The coated article of clause 3, wherein the ratio of the thickness of the second dielectric layer to the thickness of the first dielectric layer is in the range of from 3:1 to 5:1.

Clause 5: The coated article of any of clauses 1-4, wherein the second dielectric layer has a thickness in the range of from 25 nm to 100 nm.

Clause 6: The coated article of any of clauses 1-5, wherein the first dielectric layer has a thickness in the range of from 2 nm to 20 nm.

Clause 7: The coated article of any of clauses 1-6, wherein the absorbing layer comprises nickel, chromium, iron, stainless steel, niobium, sub-critical silver, or a combination thereof.

Clause 8: The coated article of any of clauses 1-7, further comprising a functional coating over at least a portion of the substrate and over and/or under the patterned coating.

Clause 9: The coated article of clause 8, wherein the functional coating is a solar control coating.

Clause 10: The coated article of any of clauses 1-9, wherein the absorbing layer comprises a thickness in the range of from greater than 0 nm to 5 nm.

Clause 11: The coated article of any of clauses 1-10, wherein the absorbing layer comprises a gradient thickness.

Clause 12: The coated article of any of clauses 1-11, wherein the substrate comprises a glass.

Clause 13: The coated article of any of clauses 1-12, wherein the substrate comprises a plastic material.

Clause 14: The coated article of any of clauses 1-13, wherein the coated article is a laminate.

Clause 15: The coated article of any of clauses 1-14, wherein a combined thickness of the first dielectric layer and the second dielectric layer is in the range of from 40 nm to 60 nm.

Clause 16: The coated article of clause 8, wherein the functional coating comprises a continuous silver infrared reflective layer.

Clause 17: The coated article of clause 8, wherein the functional coating comprises an indium tin oxide layer and/or a fluorine-doped tin oxide layer.

Clause 18: The coated article of clause 8, wherein the functional coating comprises a halogenated layer.

Clause 19: The coated article of any of clauses 1-18, wherein the coated article is an architectural glazing.

Clause 20: The coated article of any of clauses 1-19, wherein the contrast between the first reflected aesthetic and the second reflective aesthetic is visible in reflection to birds when viewed from the second side of the coated article.

Clause 21: The coated article of any of clauses 1-20, wherein the first dielectric layer comprises a thickness such that the pattern is not visible in reflection when viewed from the first side of the coated article; and wherein the second dielectric layer comprises a thickness such that the pattern is visible in reflection when viewed from the second side of the coated article.

Clause 22: The coated article of any of clauses 1-21, wherein the $\Delta E_{CMC}$ in reflection between the first reflected aesthetic and the second reflected aesthetic when viewed from the first side is less than 4.

Clause 23: The coated article of any of clauses 1-22, wherein the $\Delta E_{CMC}$ in reflection between the first reflected aesthetic and the second reflected aesthetic when viewed from the second side is greater than 8.

BRIEF DESCRIPTION OF THE DRAWINGS

The invention will be described with reference to the following drawing figures wherein like reference numbers identify like parts throughout.

FIG. 3A is a side view of a coating according to one aspect of the present invention;

FIG. 3B is a top view of a coated article coated with the coating of FIG. 3A;

FIG. 3C is a bottom view of a coated article coated with the coating of FIG. 3A;

DESCRIPTION OF THE PREFERRED EMBODIMENTS

Figure 1:
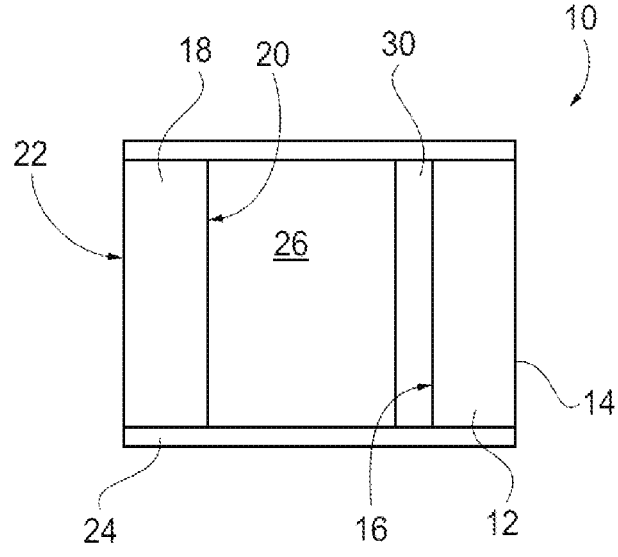
FIG. 1 is a side view of an insulating glass unit (IGU) having a coating according to one aspect of the present invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. The terms "visible region", "visible light", or "visible light spectrum" refer to electromagnetic radiation having a wavelength in the range of 380 nm to 800 nm. The terms "infrared region", "infrared radiation", or "infrared spectrum" refer to electromagnetic radiation having a wavelength in the range of greater than 800 nm to 100,000 nm. The terms "ultraviolet region", "ultraviolet radiation", or "ultraviolet (UV) spectrum" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

For purposes of the following discussion, the invention will be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles, personal transparencies such as glasses and the like, mirrors (e.g., reciprocal mirrors, multifunctional mirrors, and/or the like), displays, dynamic glazings, coatings involving functional patterning (e.g., antenna and/or the like), windows patterned for sensor compatibility (e.g., infrared), novelties such as consumer products and/or the like, etc. Therefore, it is to be understood that the specifically disclosed exemplary embodiments are presented simply to explain the general concepts of the invention, and that the invention is not limited to these specific exemplary embodiments. Additionally, while a typical "transparency" can have sufficient visible light transmission such that materials can be viewed through the transparency, in the practice of the invention, the "transparency" need not be transparent to visible light but may be translucent or opaque.

A non-limiting transparency 10 incorporating features of the invention is illustrated in FIG. 1. The transparency 10 can have any desired visible light, infrared radiation, or ultraviolet radiation transmission and/or reflection. For example, the transparency 10 can have a visible light transmission of any desired amount, e.g., greater than 0% up to 100%. In one non-limiting embodiment, the transparency 10 may have a different visible light, infrared radiation, or ultraviolet radiation transmission and/or reflection depending on which direction the transparency 10 is viewed from.

The transparency 10 of FIG. 1 is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an outer (first) major surface 20 (No. 3 surface) and an inner (second) major surface 22 (No. 4 surface) and spaced from the first ply 12. This numbering of the ply surfaces is in keeping with conventional practice in the fenestration art. The first and second plies 12, 18 can be connected together in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas such as argon or krypton gas. A coating 100 (or any of the other coatings described below) is formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired. Examples of insulating glass units are found, for example, in U.S. Pat. Nos. 4,193,236; 4,464,874; 5,088,258; and 5,106,663.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, such as 1 mm to 8 mm thick, such as 2 mm to 8 mm, such as 3 mm to 7 mm, such as 5 mm to 7 mm, such as 6 mm thick.

Figure 2:
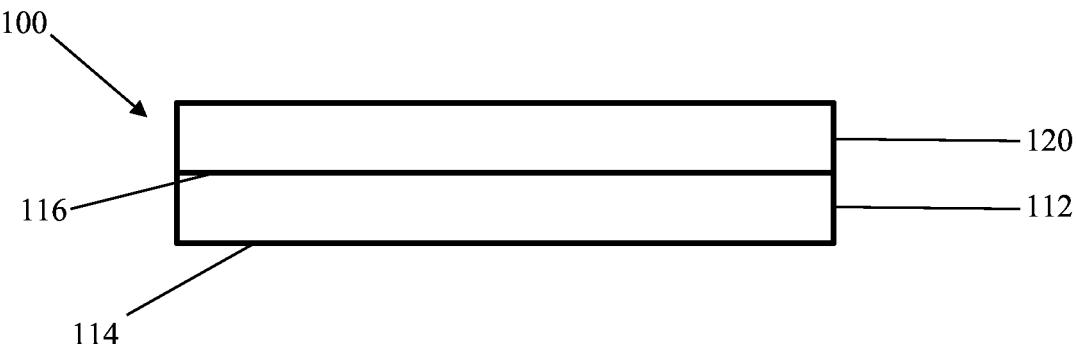
FIG. 2 is a side view of a coated article according to another aspect of the present invention.

Referring to FIG. 2, according to one-limiting embodiment, the coating 100 may include a patterned coating 120 over at least a portion of a major surface of a substrate 112 (e.g., the No. 2 surface 116 of the first ply 12).

Referring to FIG. 3A, in one non-limiting embodiment, the patterned coating 120 includes a first dielectric layer 122a over at least a portion of a major surface of a substrate 112 (e.g., the No. 2 surface 116 of the first ply 12). The first dielectric layer 122a may be a single layer or can comprise more than one film of antireflective materials and/or dielectric materials, such as, but not limited to, metal oxides, oxides of metal alloys, halides, nitrides, oxynitrides, or mixtures thereof. The first dielectric layer 122a may be transparent to visible light. Examples of suitable metal oxides or metal nitrides for the first dielectric layer 122a, or any film therein, include: oxides, nitrides, and/or oxynitrides of titanium, hafnium, zirconium, niobium, zinc, bismuth, lead, indium, tin, aluminum, silicon, and mixtures thereof. The metal oxides can have small amounts of other materials, such as manganese in bismuth oxide, tin in indium oxide, etc. Additionally, oxides or nitrides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium tin oxides or nickel or boron doped silicon oxides, can be used. The first dielectric layer 122a may be a substantially single phase film, such as a metal alloy oxide film (e.g., zinc stannate), or may be a mixture of phases composed of zinc and tin oxides or can be composed of a plurality of films. For example, the first dielectric layer 122a may include silicon oxide, silicon nitride, silicon aluminum nitride, zinc/tin alloy oxide, zinc oxide, tin oxide and/or titanium dioxide.

In one non-limiting embodiment, the first dielectric layer 122a may include a zinc/tin alloy oxide. By "zinc/tin alloy oxide" is meant both true alloys and also mixtures of the oxides. The zinc/tin alloy oxide can be obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first dielectric layer 122a is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=2/3, Formula 1 is $Zn_{2/3}Sn_{1/}$ $_3O_{4/3}$, which is more commonly described as "$Zn_2SnO_4$". A zinc stannate-containing film has one or more of the forms of Formula 1 in a predominant amount in the film.

In another non-limiting embodiment, the first dielectric layer 122a may include zinc oxide. The zinc oxide can be deposited from a zinc cathode that includes other materials to improve the sputtering characteristics of the cathode. For example, the zinc cathode can include a small amount (e.g., up to 20 wt. %, up to 15 wt. %, up to 10 wt. %, or up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin (added to enhance the conductivity of the cathode) is referred to herein as "a zinc oxide film" even though a small amount of tin may be present. The small amount of tin in the cathode (e.g., less than or equal to 10 wt. %, such as less than or equal to 5 wt. %) is believed to form tin oxide in the predominantly zinc oxide layer.

In another non-limiting embodiment, the first dielectric layer 122a may include tin oxide.

In another non-limiting embodiment, the first dielectric layer 122a may include silicon nitride.

In one non-limiting embodiment, the first dielectric layer 122a may include a multi-film structure. For example, the first dielectric layer 122a may include a first film, such as a metal alloy oxide film. The first film may include a zinc/tin alloy oxide, such as zinc stannate, silicon nitride, silicon aluminum nitride, or tin oxide. The first dielectric layer 122a may include a second film over the first film, which may be a metal oxide film. For example, the second film may include zinc oxide.

In one non-limiting embodiment, the first dielectric layer 122a may include a multi-film structure. For example, the first dielectric layer 122a may include a first film over the substrate. The first film may be a metal oxide, metal alloy oxide film, a metal nitride or a metal alloy nitride. The first film may include a zinc/tin alloy oxide, such as zinc stannate, silicon nitride, silicon aluminum nitride, or tin oxide. The first dielectric layer 122a may include second film over the first film and in direct contact with the first film, which may be a metal oxide film or a metal alloy oxide. For example, the second film may include zinc oxide or zinc stannate. A third film over and in direct contact with the second film may include zinc oxide.

The first dielectric layer 122a may have a thickness of at least 1 nm, or at least 2 nm, or at least 5 nm. The first dielectric layer 122a may have a thickness of up to 20 nm, or up to 15 nm. The first dielectric layer 122a may have a thickness in the range of from 1 nm to 20 nm, or from 2 nm to 20 nm, or from 5 nm to 15 nm.

The patterned coating 120 includes an absorbing layer 124 over at least a portion of the first dielectric layer 122a. The absorbing layer, which may also be referred to as a reflective layer, may be made of any known absorbing material. For example, the absorbing layer 124 may include nickel, chromium, iron, stainless steel, niobium, silver, mixtures thereof, and/or combinations thereof. In one non-limiting embodiment, the absorbing layer 124 may include subcritical silver. As used herein, "subcritical silver" refers to silver having a subcritical thickness. The absorbing layer 124 may have a thickness of greater than 0 nm, or at least 0.5 nm, or at least 1 nm. The absorbing layer 124 may have a thickness of up to 50 nm, or up to 20 nm, or up to 15 nm, or up to 10 nm, or up to 5 nm. For example, the absorbing layer 124 may have a thickness in the range of from greater than 0 nm to 20 nm, or from greater than 0 nm to 15 nm, or from greater than 0 nm to 10 nm, or from greater than 0 nm to 5 nm, or from 0.5 nm, to 20 nm, or from 0.5 nm to 15 nm, or from 1 nm to 10 nm, or from 1 nm to 5 nm. The absorbing layer 124 may have a gradient thickness. As used herein, "gradient thickness" refers to the thickness of the layer increasing or decreasing throughout the layer creating peaks and valleys of material.

The absorbing layer 124 may be present over a first portion 126 of the first dielectric layer 122a, where this first portion 126 does not cover the entire portion of the first dielectric layer 122a. The absorbing layer 124 over the first portion 126 of the first dielectric layer 122a may have a first reflected aesthetic. The absorbing layer 124 may be absent over a second portion 125 of the first dielectric layer 122a. The absence of the absorbing layer 124 over the second portion 125 of the first dielectric layer 122a may produce a second reflected aesthetic. The first reflected aesthetic may be different from the second reflected aesthetic. As used herein, the reflected aesthetic refers to the visible light reflected color (a*, b*, L*) as measured by conventional CIE (1931) and CIELAB systems that will be understood by one of ordinary skill in the art. If the first reflected aesthetic and the second reflected aesthetic are different, the contrast between the first reflected aesthetic and the second reflected aesthetic produces a reflected pattern. As used herein, the contrast between the first reflected aesthetic and the second reflected aesthetic is the difference in reflected color between the first reflected aesthetic and the second reflected aesthetic such as to produce the reflected pattern and which may be quantified by measure of the $\Delta E_{CMC}$ in reflection between the first reflected aesthetic and the second reflected aesthetic as described herein.

The absorbing layer 124 may be formed over the first portion 126 of the first dielectric layer 122a and absent over the second portion 125 of the first dielectric layer 122a to produce the pattern using any method known in the art, such as by masking, lasers, and/or stripes.

The patterned coating 120 includes a second dielectric layer 128a over at least a portion of the absorbing layer 124 and the first dielectric layer 122a (at the second portion 125 where the absorbing layer 124 is absent). The second dielectric layer 128a may be a single layer or can comprise more than one file of antireflective materials and/or dielectric materials, such as, but not limited to, metal oxides, oxides of metal alloys, metal nitrides, halides, nitrides of metal alloys metal, oxynitrides, oxynitrides of metal alloys metal or mixtures thereof. The second dielectric layer 128a may be transparent to visible light. Examples of suitable metal oxides, metal nitrides or metal oxynitrides for the second dielectric layer 128a, or any film therein, include oxides, nitrides, and/or oxynitrides of titanium, hafnium, zirconium, niobium, zinc, bismuth, lead, indium, tin, aluminum, silicon, and mixtures thereof. The metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium tin oxides or nickel or boron doped silicon oxides, can be used. The first dielectric layer 122a may be a substantially single phase film, such as a metal alloy oxide film (e.g., zinc stannate), or may be a mixture of phases composed of zinc and tin oxides or can be composed of a plurality of films. For example, the second dielectric layer 128a may include silicon oxide, silicon nitride, zinc/tin alloy oxide, zinc oxide, and/or titanium dioxide.

In one non-limiting embodiment, the second dielectric layer 128a may include a multi-film structure. For example, the second dielectric layer 128a may include a first film, such as a metal oxide film. The first film may include zinc oxide. The second dielectric layer 128a may include a second film over the first film, which may be a metal alloy oxide film. For example, the second film may include a zinc/tin alloy oxide, such as zinc stannate. The second dielectric layer 128a may include a third film over the second film. The third film may include $Si_3N_4$, SiAlN, SiON, SiAlON, zinc oxide, or some combination thereof.

The second dielectric layer 128a may have a thickness of at least 25 nm, or at least 30 nm, or at least 40 nm, or at least 50 nm. The second dielectric layer 128a may have a thickness of up to 100, nm, or up to 90 nm, or up to 80 nm, or up to 70 nm, or up to 60 nm. The second dielectric layer 128a may have a thickness in the range of from 25 nm to 100 nm, or from 30 nm to 90 nm, or from 40 nm to 80 nm, or from 50 nm to 70 nm, or from 50 nm to 60 nm.

Figures 4A, 4B, 4C:
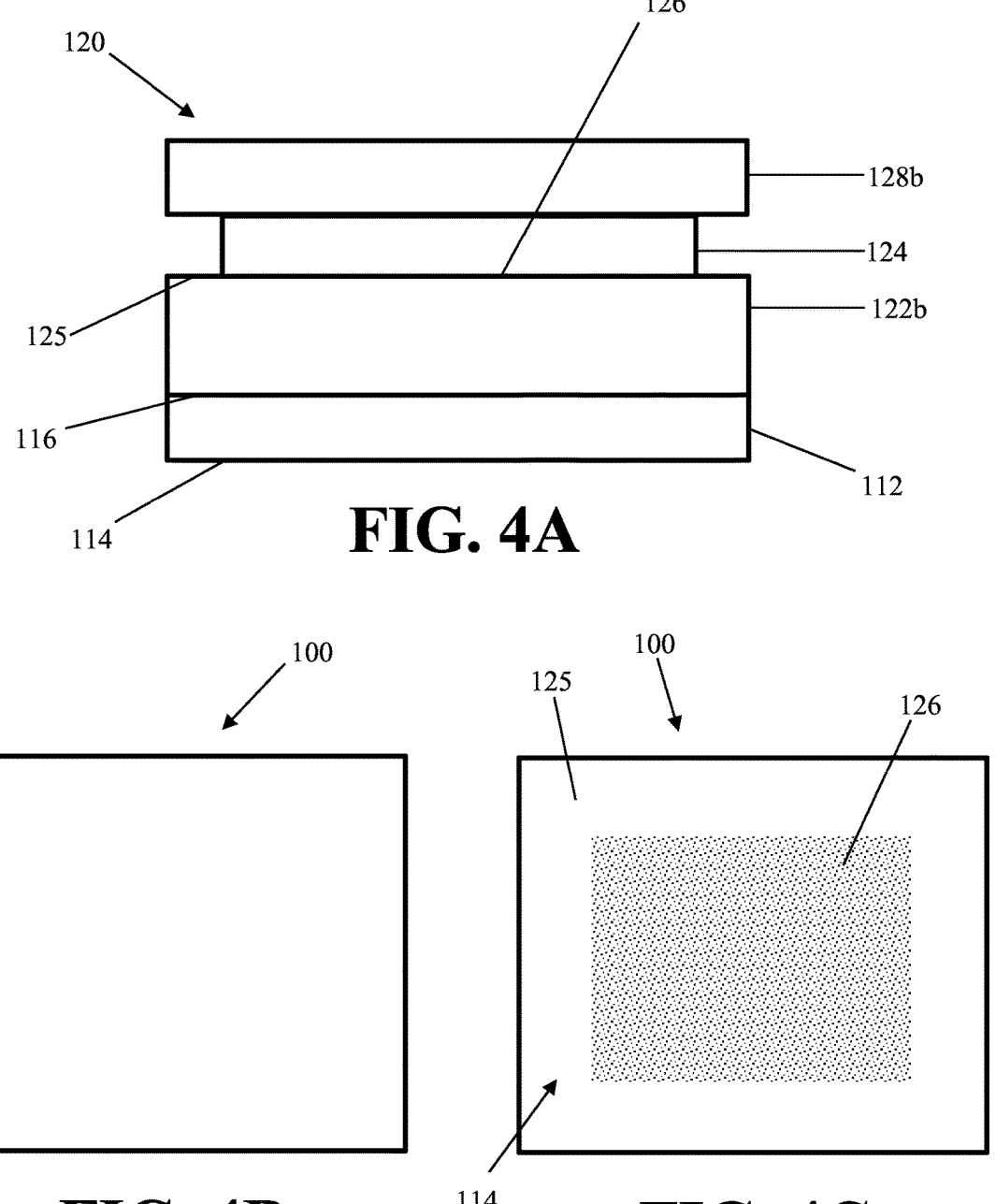
FIG. 4A is a side view of a coating according to another aspect of the present invention.
FIG. 4B is a top view of a coated article coated with the coating of FIG. 4A.
FIG. 4C is a bottom view of a coated article coated with the coating of FIG. 4A.

Referring to FIG. 4A, in another non-limiting embodiment, the patterned coating 120 may comprise a first dielectric layer 122b over at least a portion of a major surface of a substrate 112 (e.g., the No. 2 surface 116 of the first ply 12). The first dielectric layer 122b may comprise a single film or be a multi-film structure. For example, the first dielectric layer 122b may include a first film, such as a metal alloy oxide film, a metal oxide film, a metal alloy nitride film, or a metal nitride film. The first film may include a zinc/tin alloy oxide, such as zinc stannate, zinc oxide, silicon nitride, silicon aluminum nitride, or tin oxide. The first dielectric layer 122b may include second film over the first film, which may be a metal oxide film. For example, the second film may include zinc oxide or zinc stannate. Optionally, there may be a third film that may include zinc oxide. If the third film is present, then the second film may be zinc stannate.

The first dielectric layer 122b may comprise any of the materials that may be used for the first dielectric layer 122a.

The first dielectric layer 122b may have a thickness of at least 25 nm, or at least 30 nm, or at least 40 nm, or at least 50 nm. The first dielectric layer 122b may have a thickness of up to 100, nm, or up to 90 nm, or up to 80 nm, or up to 70 nm, or up to 60 nm. The first dielectric layer 122b may have a thickness in the range of from 25 nm to 100 nm, or from 30 nm to 90 nm, or from 40 nm to 80 nm, or from 50 nm to 70 nm, or from 50 nm to 60 nm.

The patterned coating 120 may include an absorbing layer 124 at least a portion of the first dielectric layer 122b. The absorbing layer 124 may be made of any known absorbing material. For example, the absorbing layer 124 may include nickel, chromium, iron, stainless steel, niobium, silver, mixtures thereof, and/or combinations thereof. In one limiting embodiment, the absorbing layer 124 may include subcritical silver. As used herein, "subcritical silver" refers to silver having a subcritical thickness. The absorbing layer 124 may have a thickness of greater than 0 nm, or at least 0.5 nm, or at least 1 nm. The absorbing layer 124 may have a thickness of up to 50 nm, or up to 20 nm, or up to 15 nm, or up to 10 nm, or up to 5 nm. For example, the absorbing layer 124 may have a thickness in the range of from greater than 0 nm to 20 nm, or from greater than 0 nm to 15 nm, or from greater than 0 nm to 10 nm, or from greater than 0 nm to 5 nm, or from 0.5 nm, to 20 nm, or from 0.5 nm to 15 nm, or from 1 nm to 10 nm, or from 1 nm to 5 nm. The absorbing layer may have a gradient thickness. As used herein, "gradient thickness" refers to the thickness of the layer increasing or decreasing throughout the layer creating peaks and valleys of material.

The absorbing layer 124 may be present over a first portion 126 of the first dielectric layer 122b, where this first portion 126 does not cover the entire portion of the first dielectric layer 122b. The absorbing layer 124 over the first portion 126 of the first dielectric layer 122b may have a first reflected aesthetic. The absorbing layer 124 may be absent over a second portion 125 of the first dielectric layer 122b. The absence of the absorbing layer 124 over the second portion 125 of the first dielectric layer 122b may produce a second reflected aesthetic. The first reflected aesthetic may be different from the second reflected aesthetic.

The patterned coating 120 may comprise a second dielectric layer 128b over at least a portion of the absorbing layer 124 and the first dielectric layer 122b where the absorbing layer 124 is absent. The second dielectric layer 128b may comprise any of the same materials as the second dielectric layer 128a.

The second dielectric layer may comprise a single film or may be multi-film structure. For example, the second dielectric layer 128b may include a first film, such as a metal alloy oxide film or a metal oxide. The first film may include a zinc/tin alloy oxide, such as zinc stannate, or zinc oxide. The second dielectric layer 128b may include a second film over the first film, which may be a metal oxide film, an alloy of a metal oxide, a metal nitride film, an alloy of a metal nitride, a metal oxynitride film, or an alloy of metal oxynitride. For example, the second film may include zinc oxide, zinc stannate, silicon nitride, or silicon oxynitride. The second dielectric layer 128b may include a third film over the second film, which may be a metal alloy oxide film. For example, the third film may include zinc stannate, zinc oxide, silicon nitride or silicon oxynitride.

The second dielectric layer 128b may have a thickness of at least 1 nm, or at least 2 nm, or at least 5 nm. The second dielectric layer 128b may have a thickness of up to 20 nm, or up to 15 nm. The second dielectric layer 128b may have a thickness in the range of from 1 nm to 20 nm, or from 2 nm to 20 nm, or from 5 nm to 15 nm.

The first dielectric layer 122a, 122b and the second dielectric layer 128a, 128b may have different thicknesses. For example, in one non-limiting embodiment shown in FIG. 3A, the second dielectric layer 128a may be thicker than the first dielectric layer 122a. A ratio of the thickness of the second dielectric layer 128a to the thickness of the first dielectric layer 122a may be at least 1.5:1, or at least 2:1, or at least 3:1, or at least 4:1. A ratio of the thickness of the second dielectric layer 128a to the thickness of the first dielectric layer 122a may be up to 40:1, or up to 20:1, or up to 15:1, or up to 10:1, or up to 8:1, or up to 5:1, or up to 4:1. A ratio of the thickness of the second dielectric layer 128a to the thickness of the first dielectric layer 122a may be in a range of from 1.5:1 to 40:1, or from 2:1 to 20:1, or from 3:1 to 15:1, or from 3:1 to 10:1, or from 3:1 to 8:1, or from 3:1 to 5:1.

In another non-limiting embodiment shown in FIG. 4A, the first dielectric layer 122b may be thicker than the second dielectric layer 128b. A ratio of the thickness of the first dielectric layer 122b to the thickness of the second dielectric layer 128b may be at least 1.5:1, or at least 2:1, or at least 3:1, or at least 4:1. A ratio of the thickness of the first dielectric layer 122b to the thickness of the second dielectric layer 128b may be up to 40:1, or up to 20:1, or up to 15:1, or up to 10:1, or up to 8:1, or up to 5:1, or up to 4:1. A ratio of the thickness of the first dielectric layer 122*b* to the thickness of the second dielectric layer 128*b* may be in a range of from 1.5:1 to 40:1, or from 2:1 to 20:1, or from 3:1 to 15:1, or from 3:1 to 10:1, or from 3:1 to 8:1, or from 3:1 to 5:1.

With one of the first dielectric layer 122*a*, 122*b* and the second dielectric layer 128*a*, 128*b* being thicker than the other, the first reflected aesthetic and/or second reflected aesthetic may be different depending on which direction you view the coated article 100 (i.e., the first side 114 versus the second side 116 of the substrate), due to the optical interference of the reflected aesthetic caused by the thickness of the dielectric layers, resulting in an asymmetric reflectance. As used herein, the term "asymmetrical reflectivity" means that the contrast between the first reflected aesthetic and second reflected aesthetic of the coating from one side is different than that of the coating from the opposite side. As used herein "optical interference" refers to the interaction of light with the dielectric, conducting, and optically absorbing layers and the distortion of light when passing through the dielectric, conducting, and optically absorbing layers. As such, the contrast between the first reflected aesthetic and the second reflected aesthetic may be greater when viewing the coated article 100 from a first direction, as compared to viewing the coated article 100 from a second direction, where the first direction corresponds to the direction of viewing the coated article 100 through the side of the coated article 100 that includes the thicker dielectric layer between the first dielectric layer 122*a*, 122*b* and the second dielectric layer 128*a*, 128*b*. The second direction corresponds to the direction of viewing the coated article 100 through the side of the coated article 100 that includes the thinner dielectric layer between the first dielectric layer 122*a*, 122*b* and the second dielectric layer 128*a*, 128*b*.

As a result of the optical interference of the present dielectric layers, it was found that thicker dielectric layers result in a greater contrast between the first reflected aesthetic of the first portion 126 and the second reflected aesthetic of the second portion 125. Because of the optical interference of the thicker dielectric layer (either the first dielectric layer 122*a*, 122*b* or the second dielectric layer 128*a*, 128*b*), the contrast between the first reflected aesthetic and the second reflected aesthetic may be high enough such that the pattern produced from this contrast is visible (to humans in the visible light spectrum) when viewing the coated article 100 from the first direction. In contrast, the optical interference of the thinner dielectric layer (either the first dielectric layer 122*a*, 122*b* or the second dielectric layer 128*a*, 128*b*) behaves differently than that caused by the thicker dielectric layer, such that the contrast between the first reflected aesthetic and the second reflected aesthetic is low enough such that the pattern produced from this contrast is not visible (to humans in the visible light spectrum) when viewing the coated article 100 from the second direction.

As used herein, the pattern being "visible" or "invisible" refers to the visibility of the pattern to the human eye in the visible light spectrum, unless explicitly stated otherwise. For example, alternative visibilities explicitly stated herein include visibility to birds in the ultraviolet spectrum.

In one non-limiting embodiment, the pattern produced from this contrast is visible in the UV spectrum, such that the pattern is visible to birds. For example, the pattern produced from this contrast may be visible from the first direction and not visible from the second direction to birds in the ultraviolet spectrum. Alternatively, the pattern produced from this contrast may be visible from both the first direction and the second direction to birds in the ultraviolet spectrum.

As a result of one of either the first dielectric layer 122*a*, 122*b* or the second dielectric layer 128*a*, 128*b* being thicker than the other, the $\Delta E_{CMC}$ in reflection between the first reflected aesthetic and the second reflected aesthetic may be greater when viewing the coated article 100 from the first direction compared to viewing the coated article 100 from the second direction. For example, the $\Delta E_{CMC}$ in reflection between the first reflected aesthetic and the second reflected aesthetic when viewing the coated article 100 from the first direction may be at least 6, or at least 7, or at least 8. For example, the $\Delta E_{CMC}$ in reflection between the first reflected aesthetic and the second reflected aesthetic when viewing the coated article 100 from the second direction may be less than 6, or less than 5, or less than 4, or less than 3, or less than 2, or less than 1. A ratio of the $\Delta E_{CMC}$ in reflection between the first reflected aesthetic and the second reflected aesthetic when viewing the coated article 100 from a first direction to the $\Delta E_{CMC}$ in reflection between the first reflected aesthetic and the second reflected aesthetic when viewing the coated article 100 from a second direction may be at least 2:1, or at least 3:1, or at least 5:1, or at least 8:1, or at least 10:1.

As used herein, $\Delta E_{CMC}$ (CIELAB) is a measure of color change using an integrated sphere with D65 Illumination, 10° observer with a specular component included according to ASTM Designation: D 2244-05 unless otherwise stated. For example, a $\Delta E_{CMC}$ of up to 4 may be sufficient to render the pattern formed from the contrast between the first reflected aesthetic and the second reflected aesthetic invisible. As another example, a $\Delta E_{CMC}$ of at least 8 may be sufficient to render the pattern formed from the contrast between the first reflected aesthetic and the second reflected aesthetic visible.

For example, in one non-limiting embodiment shown in FIG. 3A, the second dielectric layer 128*a* is thicker than the first dielectric layer 122*a*, such that the contrast between the first reflected aesthetic and the second reflected aesthetic is greater when viewing the coated article 100 from the second side 116, compared to viewing the coated article 100 from the first side 114. Due to the second dielectric layer 128*a* being thick, relative to the first dielectric layer 122*a*, the optical interference of the second dielectric layer 128*a* is high, such that the contrast between the first reflected aesthetic and the second reflected aesthetic is high enough such that the pattern produced from this contrast is visible (to humans in the visible light spectrum) when viewing the coated article 100 from the second side 116 as shown in FIG. 3B. Due to the first dielectric layer 122*a* being thin compared to the second dielectric layer 128*a*, the contrast between the first reflected aesthetic and the second reflected aesthetic may be low enough such that the pattern produced from this contrast is not visible (to humans in the visible light spectrum) when viewing the coated article 100 from first side 114 as shown in FIG. 3C.

In one non-limiting embodiment, the pattern produced from this contrast is visible in the UV spectrum, such that the pattern is visible to birds. For example, the pattern produced from this contrast may be visible from the second side 116 of the coated article 100 and not visible from the first side 114 of the coated article 100 to birds in the ultraviolet spectrum. Alternatively, the pattern produced from this contrast may be visible from both the first side 114 and the second side 116 of the coated article 100 to birds in the ultraviolet spectrum.

As a result of the second dielectric layer 128*a* being thicker than the first dielectric layer 122*a*, the $\Delta E_{CMC}$ in reflection between the first reflected aesthetic and the second reflected aesthetic may be greater when viewing the coated article 100 from the second side 116 compared to viewing the coated article 100 from the first side 114. For example, the $\Delta E_{CMC}$ in reflection between the first reflected aesthetic and the second reflected aesthetic when viewing the coated article 100 from the second side 116 may be at least 6, or at least 7, or at least 8. For example, the $\Delta E_{CMC}$ in reflection between the first reflected aesthetic and the second reflected aesthetic when viewing the coated article 100 from the first side 114 may be less than 6, or less than 5, or less than 4, or less than 3, or less than 2, or less than 1. A ratio of the $\Delta E_{CMC}$ in reflection between the first reflected aesthetic and the second reflected aesthetic when viewing the coated article 100 from the second side 116 to the $\Delta E_{CMC}$ in reflection between the first reflected aesthetic and the second reflected aesthetic when viewing the coated article 100 from the first side 114 may be at least 2:1, or at least 3:1, or at least 5:1, or at least 8:1, or at least 10:1.

In another non-limiting embodiment shown in FIG. 4A, the first dielectric layer 122b is thicker than the second dielectric layer 128b, such that the contrast between the first reflected aesthetic and the second reflected aesthetic is greater when viewing the coated article 100 from the first side 114 compared to viewing the coated article 100 from the second side 116. Due to the first dielectric layer 122b being thicker, relative to the second dielectric layer 128b, the optical interference of the first dielectric layer 122b is high, such that the contrast between the first reflected aesthetic and the second reflected aesthetic is high enough such that the pattern produced from the contrast between the first reflected aesthetic and the second reflected aesthetic is visible (to humans in the visible light spectrum) when viewing the coated article 100 from the first side 114 as shown in FIG. 4C. Due to the second dielectric layer 128b being thinner, the contrast between the first reflected aesthetic and the second reflected aesthetic may be low enough such that the pattern produced from this contrast is not visible (to humans in the visible light spectrum) when viewing the coated article 100 from the second side 116 as shown in FIG. 4B.

In one non-limiting embodiment, the pattern produced from this contrast is visible in the UV spectrum, such that the pattern is visible to birds. For example, the pattern produced from this contrast may be visible from the first side 114 of the coated article 100 and not visible from the second side 116 of the coated article 100 to birds in the ultraviolet spectrum. Alternatively, the pattern produced from this contrast may be visible from both the first side 114 and the second side 116 of the coated article 100 to birds in the ultraviolet spectrum.

As a result of the first dielectric layer 122b being thicker than the second dielectric layer 128b, the $\Delta E_{CMC}$ in reflection between the first reflected aesthetic and the second reflected aesthetic may be greater when viewing the coated article 100 from the first side 114 compared to viewing the coated article 100 from the second side 116. For example, the $\Delta E_{CMC}$ in reflection between the first reflected aesthetic and the second reflected aesthetic when viewing the coated article 100 from the first side 114 may be at least 6, or at least 7, or at least 8. For example, the $\Delta E_{CMC}$ in reflection between the first reflected aesthetic and the second reflected aesthetic when viewing the coated article 100 from the second side 116 may be less than 6, or less than 5, or less than 4, or less than 3, or less than 2, or less than 1. A ratio of the $\Delta E_{CMC}$ in reflection between the first reflected aesthetic and the second reflected aesthetic when viewing the coated article 100 from the first side 114 to the $\Delta E_{CMC}$ in reflection between the first reflected aesthetic and the second reflected aesthetic when viewing the coated article 100 from the second side 116 may be at least 2:1, or at least 3:1, or at least 5:1, or at least 8:1, or at least 10:1.

Figure 5:
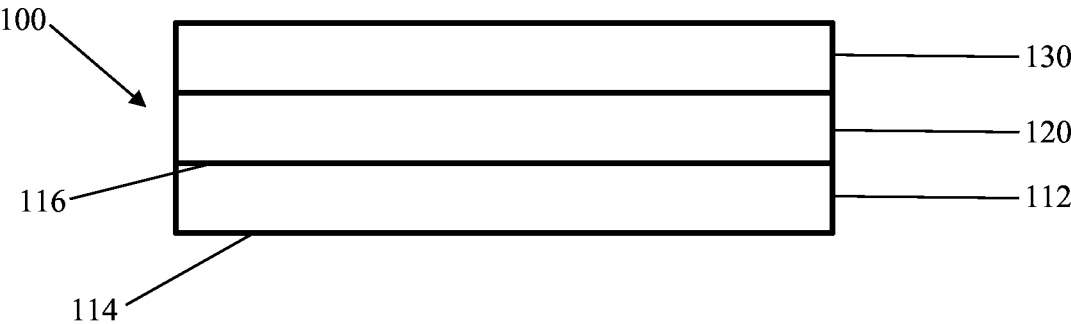
FIG. 5 is a side view of a coated article according to another aspect of the present invention.
Figure 6:
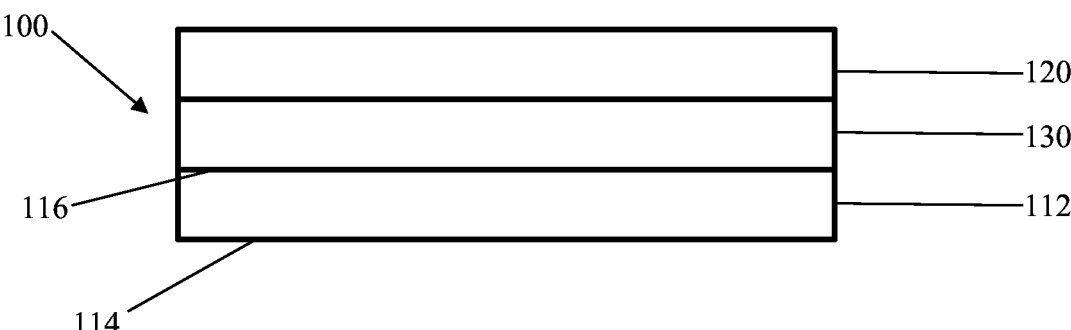
FIG. 6 is a side view of a coated article according to another aspect of the present invention.

In another non-limiting embodiment, the coating 100 may further include a functional coating 130. Referring to FIG. 5, in one non-limiting embodiment, the functional coating 130 may be over at least a portion of the patterned coating 120. Referring to FIG. 6, in another non-limiting embodiment, the functional coating 130 may be over at least a portion of a major surface of the substrate 112 (e.g., the No. 2 surface 116 of the first ply 12), and under the patterned coating 120 (i.e., between the substrate 112 and the patterned coating 120). The functional coating 130 can be deposited by any conventional method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 120 can be deposited by MSVD. Examples of MSVD coating devices and methods will be well understood by one of ordinary skill in the art and are described, for example, in U.S. Pat. Nos. 4,379,040; 4,861,669; 4,898, 789; 4,898,790; 4,900,633; 4,920,006; 4,938,857; 5,328, 768; and 5,492,750.

As used herein, a "functional coating" refers to a coating which imparts a functional benefit to the surface beyond decoration of the surface. Non-limiting examples include coatings that impart an optical property, structural property, electrical property, hygienic property, thermal property, and/or physio-chemical property to the surface. Non-limiting examples of functional coatings include at least one of a solar control coating, a low-e (low-emissivity) coating, a hydrophilic coating, a hydrophobic coating, an oleophilic coating, a low friction coating, an anti-microbial coating, an anti-fingerprint coating, an anti-fog coating, a self-cleaning coating, an easy-clean coating, a transparent conductive coating, and combinations thereof. Non-limiting examples of suitable functional coatings and coated substrates are disclosed in US 2017/0341977; US 2018/0118614; US 2019/0204480; U.S. Pat. Nos. 7,335,421; 8,865,325; 9,932, 267; and 10,479,724; all of which are incorporated herein by reference in their entirety.

Figure 7:
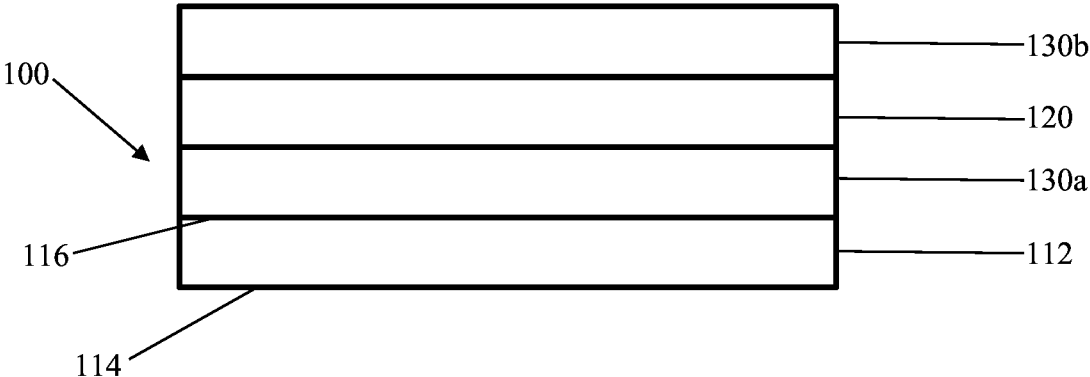
FIG. 7 is a side view of a coated article according to another aspect of the present invention.

Referring to FIG. 7, the coated article 100 may include more than one functional coating 130, such as a first functional coating 130a over at least a portion of a major surface of the substrate 112 (e.g., the No. 2 surface 116 of the first ply 12), and under the patterned coating 120, and a second functional coating 130b over at least a portion of the patterned coating 120. If the coated article 100 includes more than one functional coating 130a, 130b, the more than one functional coating 130a, 130b may be the same or different functional coatings from one another and may be any functional coating known in the art, such as the functional coatings discussed herein.

The functional coating 130 may be a solar control coating. The functional coating 130 may be a low emissivity (low-e) coating. In one non-limiting embodiment, the functional coating 130 may include a continuous metal layer, such as silver, gold, copper, platinum or nickel-chromium alloy. In another non-limiting embodiment, the functional coating 130 may include an indium tin oxide layer and/or a fluorine-doped tin oxide layer. In another non-limiting embodiment, the functional coating may include a halogenated layer.

The present disclosure also includes a method of making a coating article. The method may include providing a substrate 112 having a first side 114 and a second side 116 opposite the first side 114. The method may optionally include depositing a functional coating 130 over at least a portion of the second side 116 of the substrate 112. The method may further include depositing a patterned coating 120 over at least at portion of the second side 116 of the substrate 112 (or over at least a portion of the functional coating 130).

The depositing of the patterned coating 120 may include depositing a first dielectric layer 122a, 122b over at least a portion of the second side 116 of the substrate. The depositing of the patterned coating 120 may further include depositing an absorbing layer 124 over a first portion 126 of the first dielectric layer 122a, 122b, and not depositing the absorbing layer 124 over a second portion 125 of the first dielectric layer 122a, 122b. The absorbing layer 124 over the first portion 126 of the first dielectric layer 122a, 122b may produce a first reflected aesthetic, and the second portion 125 of the first dielectric layer 122a, 122b where the absorbing layer 124 was not deposited may produce a second reflected aesthetic.

The depositing of the absorbing layer 124 may include masking the second portion 125 of the first dielectric layer 122a, 122b with a mask and depositing the absorbing layer 124 over at least a portion of the first dielectric layer 122a, 122b such that the mask prevents the absorbing layer 124 from being deposited over the second portion 125 of the first dielectric layer 122a, 122b. The depositing of the absorbing layer 124 may include selectively applying (e.g., striping) the absorbing layer 124 over the first portion 126 of the first dielectric layer 122a, 122b such that the absorbing layer 124 is not applied over the second portion 125 of the first dielectric layer 122a, 122b. The depositing of the absorbing layer 124 may include depositing the absorbing layer 124 over at least a portion of the first dielectric layer 122a, 122b, and laser removing the absorbing layer 124 from the second portion 125 of the first dielectric layer 122a, 122b.

The method may further include depositing a second dielectric layer 128a, 128b over at least a portion of the absorbing layer 124 and the second portion 125 of the first dielectric layer 122a, 122b where the absorbing layer 124 was not applied. The method may optionally include depositing a functional coating 130 over at least a portion of the second dielectric layer 128a, 128b.

The following Examples illustrate various embodiments of the invention. However, it is to be understood that the invention is not limited to these specific embodiments.

EXAMPLES

In the following Examples, "Rf" refers to the film side reflectance and "Rg" refers to the glass side reflectance. The term "muted" reflectance refers to a reduced reflectance so as to reduce mirror effect. Three coated articles were produced using the materials and thicknesses in Table 1. The coated article of Example 1 produced a pattern that was visible when viewed from the first side of the substrate. The coated article of Example 2 produced a pattern that was visible when viewed from the second side of the substrate. The coated article of Example 3 produced a pattern that was visible when viewed from the second side of the substrate, with a muted interior reflectance.

| Layer | Example 1 Pattern visible from Rg (nm) | Example 2 Pattern visible from Rf (nm) | Example 3 Pattern visible from Rf, muted interior R (nm) |
|---|---|---|---|
| Glass | 3 mm | 3 mm | 3 mm |
| ZnSn Oxide | 40 | 3 | 3 |
| Inconel (patterned absorber) | 3 | 3 | 3 |
| ZnSn Oxide | 10 | 62 | 62 |
| Inconel (unpatterned absorber) | 0 | 0 | 3 |
| ZnSn Oxide | 0 | 0 | 6 |

What is claimed is:

1. A coated article comprising:
a substrate having a first side and a second side opposite the first side; and
a patterned coating over at least a portion of the second side of the substrate, wherein the patterned coating comprises:
a first dielectric layer over at least a portion of the second side of the substrate;
an absorbing layer over a first portion of the first dielectric layer and comprising a first reflected aesthetic, and absent over a second portion of the first dielectric layer and comprising a second reflected aesthetic; and
a second dielectric layer over at least a portion of the absorbing layer and over the second portion of the first dielectric layer, wherein the second dielectric layer is a single layer or comprises more than one film of antireflective materials and/or dielectric materials selected from metal oxides, oxides of metal alloys, metal nitrides, halides, nitrides of metal alloys metal, oxynitrides, oxynitrides of metal alloys metal or mixtures thereof;
wherein a contrast between the first reflected aesthetic and the second reflected aesthetic forms a pattern; and
wherein the contrast between the first reflected aesthetic and the second reflected aesthetic is greater when viewing the coated article from a first direction, as compared to viewing the coated article from a second direction.

2. The coated article of claim 1, wherein the contrast between the first reflected aesthetic and the second reflected aesthetic is greater when viewing the coated article from the second side, as compared to viewing the coated article from the first side.

3. The coated article of claim 2, wherein a ratio of a thickness of the second dielectric layer to a thickness of the first dielectric layer is in the range of from 2:1 to 20:1.

4. The coated article of claim 2, wherein the second dielectric layer has a thickness in the range of from 25 nm to 100 nm.

5. The coated article of claim 2, wherein the first dielectric layer has a thickness in the range of from 2 nm to 20 nm.

6. The coated article of claim 1, wherein the absorbing layer comprises nickel, chromium, iron, stainless steel, niobium, sub-critical silver, or a combination thereof.

7. The coated article of claim 1, further comprising a functional coating over at least a portion of the substrate and over and/or under the patterned coating.

8. The coated article of claim 7, wherein the functional coating is a solar control coating.

9. The coated article of claim 1, wherein the absorbing layer comprises a thickness in the range of from greater than 0 nm to 5 nm.

10. The coated article of claim 1, wherein the absorbing layer comprises a gradient thickness.

11. The coated article of claim 1, wherein the substrate comprises a glass or a plastic material.

12. The coated article of claim 1, wherein a combined thickness of the first dielectric layer and the second dielectric layer is in the range of from 40 nm to 60 nm.

13. The coated article of claim 7, wherein the functional coating comprises a continuous silver infrared reflective layer.

14. The coated article of claim 7, wherein the functional coating comprises an indium tin oxide layer and/or a fluorine-doped tin oxide layer.

15. The coated article of claim 7, wherein the functional coating comprises a halogenated layer.

16. The coated article of claim 1, wherein the coated article is an architectural glazing or a laminate.

17. The coated article of claim 2, wherein the contrast between the first reflected aesthetic and second reflective aesthetic is visible in reflection to birds when viewed from the second side of the coated article.

18. The coated article of claim 2, wherein the first dielectric layer comprises a thickness such that the pattern is not visible in reflection when viewed from the first side of the coated article; and wherein the second dielectric layer comprises a thickness such that the pattern is visible in reflection when viewed from the second side of the coated article.

19. The coated article of claim 2, wherein the ΔECMC in reflection between the first reflected aesthetic and the second reflected aesthetic when viewed from the first side is less than 4.

20. The coated article of claim 2, wherein the ΔECMC in reflection between the first reflected aesthetic and the second reflected aesthetic when viewed from the second side is greater than 8.

\*    \*    \*    \*    \*